(12) United States Patent
Kobayashi et al.

(10) Patent No.: US 7,348,056 B2
(45) Date of Patent: Mar. 25, 2008

(54) FINE PARTICLE DISPERSION COMPOSITION, OPTICAL COMPONENT, OPTICAL FILM LAMINATE, POLARIZATION SPLITTING DEVICE, AND METHOD FOR MANUFACTURING THE OPTICAL COMPONENT

(75) Inventors: Tomio Kobayashi, Miyagi (JP); Yoshihito Fukushima, Miyagi (JP); Masaki Kagawa, deceased, late of Miyagi (JP); by Fumiko Kagawa, legal representative, Shiogama (JP); Kazuhiko Morisawa, Miyagi (JP); Hatsue Koishikawa, Miyagi (JP)

(73) Assignee: Sony Corporation, Tokyo (JP)

( * ) Notice: Subject to any disclaimer, the term of this patent is extended or adjusted under 35 U.S.C. 154(b) by 296 days.

(21) Appl. No.: 10/854,591

(22) Filed: May 26, 2004

(65) Prior Publication Data
US 2005/0163971 A1    Jul. 28, 2005

(30) Foreign Application Priority Data
May 28, 2003    (JP)    ............................ P2003-150551

(51) Int. Cl.
*B32B 5/16*    (2006.01)
*B32B 27/18*    (2006.01)
(52) U.S. Cl. ........................ 428/323; 428/328; 524/435
(58) Field of Classification Search ..................... None
See application file for complete search history.

(56) References Cited

U.S. PATENT DOCUMENTS
5,997,621 A * 12/1999 Scholz et al. .................. 106/13

FOREIGN PATENT DOCUMENTS
EP        1 298 165 A2        4/2003
WO        WO 96/18691         6/1996

* cited by examiner

*Primary Examiner*—Monique R. Jackson
(74) *Attorney, Agent, or Firm*—Sonnenschein Nath & Rosenthal LLP

(57) ABSTRACT

The invention provides a fine particle dispersion composition that does not depend on a curing method and that has adaptability to the curing methods and versatility and can provide a highly transparent optical component, an optical component using the fine particle dispersion composition and a method of manufacturing the same, and an optical film laminate using the optical component, and also provides a polarization splitting device using the optical component. In order to achieve the above, there is provided an optical component, which is obtained by curing a fine particle dispersion composition, which comprises metal-oxide fine particles, an organic resin material adapted to cure by absorbing energy, one of a polyoxyethylene alkyl ether phosphoric acid-based surfactant and a polyoxyethylene alkyl ether carboxylic acid-based surfactant, each of which has a molecular weight of 500 or more, and an organic solvent.

8 Claims, 8 Drawing Sheets

FIG. 6

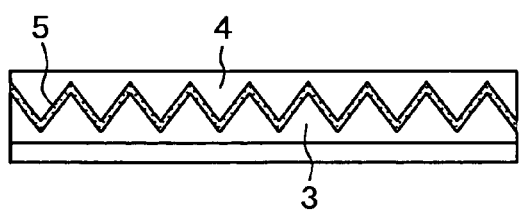

FIG. 7

| COMPONENT | SIGN | CLASS NAME | PRODUCTION METHOD | MANUFACTURE | TRADE NAME |
|---|---|---|---|---|---|
| FINE PARTICLES | T-1 | SURFACE HYDROPHILIC $TiO_2$ | BAKING METHOD | ISHIHARA SANGYO KAISHA, LTD. | TTO-51 (A) |
| | T-2 | SURFACE WATER REPELLENT $TiO_2$ | BAKING METHOD | ISHIHARA SANGYO KAISHA, LTD. | TTO-51 (C) |
| | T-3 | SURFACE HYDROPHILIC $TiO_2$ | WET METHOD | ISHIHARA SANGYO KAISHA, LTD. | TTO-S-1 |
| | T-4 | SURFACE WATER REPELLENT $TiO_2$ | WET METHOD | ISHIHARA SANGYO KAISHA, LTD. | TTO-S-2 |

F I G. 8

| COMPONENT | SIGN | CLASS NAME | COMPONENT NAME | MANUFACTURE | TRADE NAME |
|---|---|---|---|---|---|
| ORGANIC RESIN MATERIAL | R-1 | ALICYCLIC EPOXY RESIN | 3,4-EPOXYCYCLOHEXENYLMETHYL 3',4'-EPOXYCYCLOHEXANE CARBOXYLATE | DAICEL CHEMICAL INDUSTRIES, LTD. | CEL2021P |
| | R-2 | ALICYCLIC EPOXY RESIN | 1,2-EPOXY-4-(2-OXIRANYL) CYCLOHEXANE ADDUCT OF 2,2-BIS(HYDROXYMETHYL)-1-BUTANOL | DAICEL CHEMICAL INDUSTRIES, LTD. | EHPE3150 |
| | R-3 | ALICYCLIC EPOXY RESIN COMPOSITION | 3,4-EPOXYCYCLOHEXENYLMETHYL 3',4'-EPOXYCYCLOHEXANE CARBOXYLATE ETC. | HANNA KAGAKU KOGYO KABUSHIKI KAISHA | TOH-600B |
| | R-4 | ALICYCLIC EPOXY RESIN | 2,2-BIS[4-(2,3-EPOXYPROPOXY) CYCLOHEXYL]PROPANE | JAPAN EPOXY RESIN, CO., LTD. | YX8000 |
| | R-5 | ALICYCLIC EPOXY RESIN | BIS(2,3-EPOXYPROPOXY CYCLOHEXYL) METHANE | JAPAN EPOXY RESIN, CO., LTD. | YL6753 |
| | R-6 | ACID ANHYDRIDE | 4-METHYL HEXAHYDRO PHTHALIC ANHYDRIDE | NEW JAPAN CHEMICAL CO., LTD. | MH-700 |
| | R-7 | ACID ANHYDRIDE COMPOSITION | METHYL HEXAHYDRO PHTHALIC ANHYDRIDE & HEXAHYDRO PHTHALIC ANHYDRIDE ETC. | HANNA KAGAKU KOGYO KABUSHIKI KAISHA | TOH-600H |
| | R-8 | OXETANE RESIN | 3-ETHYL-3-HYDROXY-METHYL OXETANE | TOAGOSEI CO., LTD. | OXT-101 |
| | R-9 | ACRYLIC ESTER | DIPENTA-ERYTHRITOL HEXA ACRYLATE | NIPPON KAYAKU CO., LTD. | |

F I G. 9

| COMPONENT | SIGN | CLASS NAME | COMPONENT NAME | MANUFACTURE | TRADE NAME |
|---|---|---|---|---|---|
| SUR-FACTANTS | A-1 | ANIONIC SURFACTANT | SODIUM DODECYL BENZENESULFONATE | | |
| | A-2 | ANIONIC SURFACTANT | LAUROYL SARCOSINE SODIUM | | |
| | A-3 | NONIONIC SURFACTANT | SORBITAN MONOOLEATE | | |
| | A-4 | NONIONIC SURFACTANT | SORBITAN TRIOLEATE | | |
| | A-5 | NONIONIC SURFACTANT | POLYOXYETHYLENE SORBITAN TRIOLEATE | | |
| | A-6 | ANIONIC SURFACTANT | POLYOXYETHYLENE OLEYL ETHER PHOSPHATE (OLETH-3 PHOSPHATE) | CRODA JAPAN CO., LIMITED. | Crodafos N3A |
| | A-7 | ANIONIC SURFACTANT | POLYOXYETHYLENE OLEYL ETHER PHOSPHATE (OLETH-10 PHOSPHATE) | CRODA JAPAN CO., LIMITED. | Crodafos N10A |
| | A-8 | ANIONIC SURFACTANT | POLYOXYETHYLENE POLYOXYPROPYLENE CETYL ETHER PHOSPHATE | CRODA JAPAN CO., LIMITED. | Crodafos SG |
| | A-9 | CATIONIC SURFACTANT | QUATERNIUM-91, CETRIMONIUM METHOSULFATE, CETEARYL ALCOHOL | | |
| | A-10 | ANIONIC SURFACTANT | POLYOXYETHYLENE ALKYL ETHER SULFATE | | |
| | A-11 | ANIONIC SURFACTANT | POLYOXYETHYLENE ALKYL ETHER CARBOXYLATE | LION CORPORATION | ENAGIOL EC-30 |
| | A-12 | NONIONIC SURFACTANT | HIGHER ALCOHOL | | |

FIG. 10

| COMPONENT | DISPERSION SYSTEM | EXAMPLES | | | | | | | | | | | | | | | | | | | |
|---|---|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 18 | 19 | 20 |
| FINE PARTICLES | T-1 | 9 | | | | 9 | 9 | 9 | 9 | 9 | 9 | 9 | 9 | 9 | 9 | 9 | 9 | 9 | 9 | 9 | 9 |
| | T-2 | | 9 | | | | | | | | | | | | | | | | | | |
| | T-3 | | | 9 | | | | | | | | | | | | | | | | | |
| | T-4 | | | | 9 | | | | | | | | | | | | | | | | |
| ORGANIC RESIN MATERIALS | R-1 | 2 | 2 | 2 | 2 | | | | | | 2 | 2 | | 1 | 2 | 4 | | | | | |
| | R-2 | | | | | 2 | | | | | | | 1 | 1 | | | | 2 | | | 2 | 2 |
| | R-3 | | | | | | 2 | | | | | | | | | | | | | | |
| | R-4 | | | | | | | 2 | | | | | | | | | | | | | | |
| | R-5 | | | | | | | | 2 | | | | | | | | | | | | | |
| | R-6 | 2 | 2 | 2 | 2 | 2 | | 2 | 2 | | 2 | | 2 | | | 4 | 2 | | | 2 | 2 |
| | R-7 | | | | | | | 2 | | | | | | | | | | | | | | |
| | R-8 | | | | | | | | | | | | | 2 | 4 | | 1 | | | | | |
| | R-9 | | | | | | | | | 4 | | | | | | | | | | 3 | | |
| SURFACTANTS | A-1 | | | | | | | | | | | | | | | | | | | | | |
| | A-2 | | | | | | | | | | | | | | | | | | | | | |
| | A-3 | | | | | | | | | | | | | | | | | | | | | |
| | A-4 | | | | | | | | | | | | | | | | | | | | | |
| | A-5 | | | | | | | | | | | | | | | | | | | | | |
| | A-6 | | | | | | | | | | 2 | | | | | | | | | | | |
| | A-7 | 2 | 2 | 2 | 2 | 2 | 2 | 2 | 2 | 2 | | 2 | 2 | 2 | 2 | 2 | 2 | | | | | 2 |
| | A-8 | | | | | | | | | | | | | | | | | | 2 | 2 | | |
| | A-9 | | | | | | | | | | | | | | | | | | | | | |
| | A-10 | | | | | | | | | | | | | | | | | | | | | 2 |
| | A-11 | | | | | | | | | | | | | | | | | | | 2 | | |
| | A-12 | | | | | | | | | | | | | | | | | | | | | |
| ORGANIC SOLVENT | MEK | 85 | 85 | 85 | 85 | 85 | 85 | 85 | 85 | 85 | 85 | 85 | 85 | 85 | 85 | 85 | 85 | 85 | 86 | 85 | 83 |
| EVALUATION RESULTS | DISPERSIBILITY | ○ | ○ | ○ | ○ | ○ | ○ | ○ | ○ | ○ | ○ | ○ | ○ | ○ | ○ | ○ | ○ | ○ | ○ | ○ | ○ |
| | TRANSPARENCY OF FILM | ○ | ○ | ○ | ○ | ○ | ○ | ○ | ○ | ○ | ○ | ○ | ○ | ○ | ○ | ○ | ○ | ○ | ○ | ○ | ○ |

NUMERALS IN THE TABLE ARE IN wt%

FIG. 11

| COMPONENT | DISPERSION SYSTEM | COMPARATIVE EXAMPLES ||||||||||||
| | | 21 | 22 | 23 | 24 | 25 | 26 | 27 | 28 | 29 | 30 | 31 | 32 |
|---|---|---|---|---|---|---|---|---|---|---|---|---|---|
| FINE PARTICLES | T-1 | 9 | 9 | 9 | 9 | 9 | 9 | 9 | 9 | 9 | 9 | 9 | 9 |
| | T-2 | | | | | | | | | | | | |
| | T-3 | | | | | | | | | | | | |
| | T-4 | | | | | | | | | | | | |
| ORGANIC RESIN MATERIALS | R-1 | | | 4 | 4 | 4 | 4 | | 4 | | 2 | | |
| | R-2 | 2 | 2 | | | | | | | | | 2 | 2 |
| | R-3 | | | | | | | | | | | | |
| | R-4 | | | | | | | | | | | | |
| | R-5 | | | | | | | | | | | | |
| | R-6 | 2 | 2 | | | | | 4 | | 4 | 2 | 2 | 2 |
| | R-7 | | | | | | | | | | | | |
| | R-8 | | | | | | | | | | | | |
| | R-9 | | | | | | | | | | | | |
| SUR-FACTANTS | A-1 | | | | | | 2 | 2 | | | 2 | | |
| | A-2 | | 2 | | | | | | | | | | |
| | A-3 | | | 2 | | | | | | | | | |
| | A-4 | | | | 2 | | | | | | | | |
| | A-5 | | | | | 2 | | | | | | | |
| | A-6 | | | | | | | | | | | | |
| | A-7 | | | | | | | | | | | | |
| | A-8 | | | | | | | | | | | | |
| | A-9 | | | | | | | | | | | | |
| | A-10 | | | 2 | | | | | | | | 2 | |
| | A-11 | | | | | | | | | | | | |
| | A-12 | | | | | | | | | | | | 2 |
| ORGANIC SOLVENT | MEK | 85 | 85 | 85 | 85 | 85 | 85 | 85 | 87 | 87 | 85 | | |
| EVALUATION RESULTS | DISPERSIBILITY | × | × | × | × | × | △ | × | × | △ | × | × | × |
| | TRANSPARENCY OF FILM | × | × | × | × | × | × | — | × | × | × | × | × |

NUMERALS IN THE TABLE ARE IN wt%

FIG. 12

| COLUMN No. | ITEMS | | COMPOSITION No. | 1 | 2 | 3 | 4 | 5 | 6 |
|---|---|---|---|---|---|---|---|---|---|
| | | | | MINIMUM | | INTERMEDIATE | | MAXIMUM | |
| | | | | MIN | MAX | MIN | MAX | MIN | MAX |
| (1) | TiO$_2$ FINE PARTICLES (T-1) | vol% | AMOUNT OF TiO$_2$ | 10 | 10 | 20 | 20 | 50 | 50 |
| (2) | CURED RESIN (R-3+R-7) | | | 81 | 45 | 72 | 40 | 45 | 25 |
| (3) | SURFACTANT (A-7) | | AMOUNT OF SURFACTANT | 9 | 45 | 8 | 40 | 5 | 25 |
| (4) | (3)/((2)+(3))×100 | | | 10 | 50 | 10 | 50 | 10 | 50 |
| (5) | TiO$_2$ FINE PARTICLES (T-1) | wt% | | 28.9 | 29.9 | 47.8 | 49.0 | 74.4 | 79.3 |
| (6) | CURED RESIN (R-3+R-7) | | | 64.7 | 37.1 | 47.5 | 27.0 | 18.5 | 11.0 |
| (7) | SURFACTANT (A-7) | | | 6.4 | 33.0 | 4.7 | 24.0 | 7.1 | 9.7 |
| (8) | (7)/(5) | | | 0.22 | 1.1 | 0.098 | 0.49 | 0.095 | 0.12 |
| | REFRACTION INDEX | | | 1.66 | 1.64 | 1.76 | 1.76 | 2.12 | 2.12 |

FIG. 13

| COLUMN No. | ITEMS | | COMPOSITION No. | 7 | 8 | 9 | 10 |
|---|---|---|---|---|---|---|---|
| | | | | MIN | MAX | MIN | MAX |
| (1) | SiO$_2$ FINE PARTICLES (R-9) | vol% | AMOUNT OF SiO$_2$ | 20 | 20 | 50 | 50 |
| (2) | CURED RESIN (R-9) | | | 72 | 40 | 45 | 25 |
| (3) | SURFACTANT (A-7) | | AMOUNT OF SURFACTANT | 8 | 40 | 5 | 25 |
| (4) | (3)/((2)+(3))×100 | | | 10 | 50 | 10 | 50 |
| (5) | SiO$_2$ FINE PARTICLES | wt% | | 34.2 | 35.3 | 62.4 | 68.5 |
| (6) | CURED RESIN (R-9) | | | 60.0 | 34.4 | 34.9 | 16.7 |
| (7) | SURFACTANT (A-7) | | | 5.8 | 30.3 | 2.7 | 14.8 |
| (8) | (7)/(5) | | | 0.17 | 0.86 | 0.043 | 0.22 |
| | REFRACTION INDEX | | | 1.48 | 1.49 | 1.51 | 1.48 |

FINE PARTICLE DISPERSION COMPOSITION, OPTICAL COMPONENT, OPTICAL FILM LAMINATE, POLARIZATION SPLITTING DEVICE, AND METHOD FOR MANUFACTURING THE OPTICAL COMPONENT

RELATED APPLICATION DATA

The present application claims priority to Japanese Application(s) No(s). P2003-150551 filed May 28, 2003, which application(s) is/are incorporated herein by reference to the extent permitted by law.

BACKGROUND OF THE INVENTION

1. Field of the Invention

The present invention relates to a fine particle dispersion composition, to an optical component, to an optical film laminate, to a polarization splitting device, and to a method for manufacturing an optical component.

2. Description of Related Art

In recent years, there has been proposed formation of an optical film having a predetermined optical characteristic, such as an anti-reflection film (AR film), by applying a composition, which is obtained by dispersing fine particles made of high refractive-index metal-oxide (for example, $TiO_2$, ITO, $CeO_2$, $Y_2O_3$, $IZO(In_2O_3$—ZnO), $ZrO_2$, ZnO, $Al_2O_3$, $SeO_2$, $SnO_2$, $Nb_2O_5$, or $Ta_2O_5$) or low refractive-index metal oxide (for instance, $SiO_2$) into highly transparent organic resin, onto a transparent substrate and thereafter drying and hardening the composition (see, for example, Patent Document 1 and Patent Document 2).

Especially, a method of manufacturing a highly transparent optical component, which has a high refractive index of 1.6 or more, at low cost by dispersing high refractive index fine particles made of, for instance, $TiO_2$ is important, because high refractive index resins, whose refractive index is equal to or higher than 1.7, are generally hard to obtain (see, for example, Nonpatent Document 1).

At hardening in that case, an active energy ray curing technique using ultraviolet (UV) rays is often used, because this technique has an immediate effect of and is convenient for hardening of a thin layer, such as an AR film, having a thickness of ten-odd nm to hundred-odd nm.

[Patent Document 1]
Japanese Patent Application Publication Laid-Open No. 2000-275404 (paragraph Nos. 0013 to 0035 and FIG. 2)

[Patent Document 2]
Japanese Patent Application Publication Laid-Open No. 2001-296401 (paragraph Nos. 0014 to 0065 and FIG. 1)

[Nonpatent Document 1]
F. Ide, *KOKOMADEKITA TOMEI-JUSHI*, Kogyo Chosakai, 2001, p. 19.

SUMMARY OF THE INVENTION

However, although the process of applying, drying, and irradiating active energy rays onto the composition can be applied to the formation of a thin optical film as above-mentioned, this process has a problem in curing a thick film having a thickness of hundreds nm or more. That is, a cured state of a surface part and that of an inner part thereof, which are resulted from irradiation of active energy rays from the surface thereof, differ from each other. This causes unevenness of the optical characteristic in the optical film. Especially, in a case where dispersed fine particles are made of $TiO_2$, because of the fact that $TiO_2$ itself has properties of absorbing and shielding short wavelength light, such as UV, this has a problem that the cured state of a deep lower portion largely differs from that of a neighborhood portion of the surface.

Also, there has been a problem that when the curing of the thick layer having a thickness of hundreds nm, in which $TiO_2$ fine particles are dispersed, is forcibly performed, heat generated at the irradiation of energy rays causes thermal deformation of a base member and reduces yield. This problem has become more prominent when a lens, a microlens array, and an optical element substrate and so on, which have thicknesses ranging from tens μ to hundreds μ, are produced.

It is sufficient for uniformly curing a thick film to use a thermosetting resin as an organic resin. However, in this case, the dispersibility of fine particles in the organic resin is low. Thus, the transparency of the cured optical film has become a problem.

Additionally, cured resins respectively constituting the transparent base member of the thick film and the optical film, which is a thin film, become resinous constituents of different types, so that, sometimes, affinity or adhesion between the transparent material and the optical film is insufficient, and that the transparent material and the optical film is peeled off each other.

The invention is accomplished in view of the problems of the related art, and aims at providing a fine particle dispersion composition that does not depend on a curing method and that has adaptability to the curing methods and versatility and can provide a highly transparent optical component, at providing an optical component using the fine particle dispersion composition and a method of manufacturing the same, and at providing an optical film laminate using the optical component, and also providing a polarization splitting device using the optical component.

To solve the problems, according to one embodiment of the present invention, there is provided a fine particle dispersion composition, which becomes an optical component by being cured and which includes metal-oxide fine particles, an organic resin material adapted to cure by absorbing energy, one of a polyoxyethylene alkyl ether phosphoric acid-based surfactant and a polyoxyethylene alkyl ether carboxylic acid-based surfactant, each of which has a molecular weight of 500 or more, and an organic solvent.

To solve the problems, in the fine particle dispersion composition according to another embodiment of the present invention, which is included by the above-mentioned embodiment, the organic resin material is at least an organic resin selected from the group consisting of a thermosetting resin, an energy ray curing epoxy resin, an energy ray acrylate resin, and an energy ray curing oxetane resin.

According to the above-mentioned embodiments of the present invention, fine particles are uniformly dispersed in the fine particle dispersion composition. The particle size distribution of the dispersed fine particles is small. The dispersed fine particles do not reaggregate at the stage of drying organic solvent. Thus, a highly transparent optical component having a desired refractive index can be formed. Further, the fine particle dispersion composition does not depend upon the curing methods, such as an energy ray irradiation curing method and a heat curing method. Thus, optical components, whose thicknesses are within a wide range of thickness from that of a thin film (hundred-odd nm or less) to that of a thick film (hundreds nm to hundreds μm), can be formed by using organic resins of the same type as bases.

Also, the particle size distribution at dispersion is improved. The invention promotes the dispersion of the fine particles, which is performed so that the size of the dispersed particles becomes a primary particle size. Thus, the productivity can be enhanced by omitting filter filtration, which has hitherto been performed, for removing large agglomerated particles after dispersion and mixing.

The fine particles are defined herein to be those made of at least a metal oxide selected from the group consisting of $TiO_2$, ITO, $CeO_2$, $Y_2O_3$, $IZO(In_2O_3—ZnO)$, $ZrO_2$, ZnO, $Al_2O_3$, $SeO_2$, $SnO_2$, $Nb_2O_5$, and $Ta_2O_5$.

The thermosetting epoxy resin is a resin having at least one epoxy group, and has only to be at least one of, for example, 3,4-epoxycyclohexenylmethyl 3',4'-epoxy cyclohexane carboxylate, 1,2-epoxy-4-(2-oxiranyl)cyclohexane adduct of 2,2-bis(hydroxymethyl)-1-butanol, aromatic ring hydrogenation alicyclic epoxy resin, 2,2-bis(4-(2,3-epoxypropoxy)cyclohexyl)propane, and bis (2,3-epoxypropoxy cyclohexyl)methane. Further, one kind of acid anhydride selected from the group consisting of hexahydro phthalic anhydride, methyl hexahydro phthalic anhydride, 3,4-methylhexahydro phthalic anhydride, and 4-methylhexahydro phthalic anhydride may be added as epoxy resin curing agents.

To solve the problems, in the fine particle dispersion composition according to further another embodiment of the present invention, the fine particles are made of $TiO_2$.

According to the above-mentioned embodiment of the present invention, even in the case of curing a thick film having a thickness of hundreds μm or more, which high refractive index particles, such as $TiO_2$ particles, having high ultraviolet absorption power and shielding ability, favorable curing can be achieved without unevenness of curing and without thermal deformation. Thus, the invention can provide a high refractive-index optical component consisting of objective inorganic particles and an organic resin.

To solve the problems, in the fine particle dispersion composition according to further another embodiment of the present invention, the weight ratio of the surfactant to the fine particles is 0.043 to 1.1.

According to the above-mentioned embodiment of the present invention, the dispersion promotion effect of the surfactant effectively acts on the fine particles. Thus, the fine particles are dispersed so that the size of the dispersed particles becomes a primary particle size. The dispersed fine particles do not reaggregate at the stage of drying organic solvent.

To solve the problems, according to further another embodiment of the present invention, there is provided an optical component, which comprises a fine particle dispersion composition that is cured and includes metal-oxide fine particles, an organic resin material adapted to cure by absorbing energy, one of a polyoxyethylene alkyl ether phosphoric acid-based surfactant and a polyoxyethylene alkyl ether carboxylic acid-based surfactant, each of which has a molecular weight of 500 or more, and an organic solvent.

According to the above-mentioned embodiment of the invention, a cured constituting part included as a constituent of the optical component does not deteriorate high-temperature and high-humidity durability. The fine particles are dispersed so that the size of each of the dispersed particles becomes a primary particle size. Thus, the invention can provide an optical component, which excels in environmental durability (that is, there is little change in optical characteristics, such as a transmissivity and a refractive index, under high temperature and high humidity conditions).

To solve the problems, according to further another embodiment of the present invention, there is provided an optical film laminate, which comprises stacked plural optical films that differ in refractive index from one another. At least one of the optical films is obtained by curing a fine particle dispersion composition that includes metal-oxide fine particles, an organic resin material adapted to cure by absorbing energy, one of a polyoxyethylene alkyl ether phosphoric acid-based surfactant and a polyoxyethylene alkyl ether carboxylic acid-based surfactant, each of which has a molecular weight of 500 or more, and an organic solvent.

According to the above-mentioned embodiment of the present invention, the materials of the organic resins constituting the layers of the laminate are of the same type. Thus, the affinity or adhesion between the layers of the laminate can be improved. Improvement of yield and reliability can be expected.

To solve the problems, according to further another embodiment of the present invention, there is provided a polarization splitting device that comprises a transparent base member having inclined plane surfaces formed therein by grooving and differ in inclination direction from and face each other, and also comprises a polarization splitting multilayer film formed on the inclined plane surface of the base member. At least one of the transparent base member and/or the polarization splitting multilayer film is obtained by curing a fine particle dispersion composition that includes metal-oxide fine particles, an organic resin material adapted to cure by absorbing energy, one of a polyoxyethylene alkyl ether phosphoric acid-based surfactant and a polyoxyethylene alkyl ether carboxylic acid-based surfactant, each of which has a molecular weight of 500 or more, and an organic solvent.

According to the above-mentioned embodiment of the present invention, uniform distribution of transmittance of light, whose amount is obtained as that of converted P-polarized light, can easily be obtained. Thus, considerable improvement in yield of the polarization splitting device is enabled. Also, uniform curing of a thick film is enabled. Consequently, an optical component made of a thick material having a high refractive index, which is equal to or higher than 1.8, can be produced by a method similar to a resin molding method.

To solve the problems, according to further another embodiment of the present invention, there is provided a method of manufacturing an optical component, comprises the step of performing dispersion treatment on metal-oxide fine particles, an organic resin material adapted to cure by absorbing energy, one of a polyoxyethylene alkyl ether phosphoric acid-based surfactant and a polyoxyethylene alkyl ether carboxylic acid-based surfactant, each of which has a molecular weight of 500 or more, in an organic solvent, together with high hardness metallic balls or ceramic balls, and the step of subsequently applying dispersion solution and the step of evaporating the organic solvent.

According to the above-mentioned embodiment of the present invention, the method of manufacturing an optical component can be applied to manufacture of optical components having all thicknesses included within a range from that of a thin film (hundred-odd nm or less) to that of a thick film (hundreds nm to hundreds μm). Thus, this method becomes advantageous in convenience and economical efficiency.

As above-mentioned, according to the embodiments of the present invention, a highly transparent optical component having a desired refractive index can be formed. Further, optical components, whose thicknesses are within a wide range of thickness from that of a thin film (hundred-odd nm or less) to that of a thick film (hundreds nm to hundreds μm), can be formed by using organic resins of the same type as bases. Also, the productivity can be enhanced by omitting filter filtration, which has hitherto been performed, for removing large agglomerated particles after dispersion and mixing.

According to further another embodiment of the present invention, an objective high-refractive-index optical component, which consists of inorganic particles and an organic resin, can be provided.

According to further another embodiment of the present invention, fine particles are dispersed so that the dispersed particles each have a primary particle size. This prevents an occurrence of reaggregation of the dispersed particles at the stage of drying the organic solvent.

According to further another embodiment of the present invention, an optical component, which excels in environmental durability (that is, there is little change in optical characteristics, such as a transmissivity and a refractive index, under high temperature and high humidity conditions) can be provided.

According to further another embodiment of the present invention, the affinity or adhesion between the layers of the laminate can be improved. Improvement of yield and reliability can be expected.

According to further another embodiment of the present invention, considerable improvement in yield of the polarization splitting device is enabled. Also, an optical component made of a thick material having a high refractive index, which is equal to or higher than 1.8, can be produced by a method similar to a resin molding method. Various large area optical elements can be produced.

According to further another embodiment of the present invention, the process of manufacturing an optical component becomes advantageous in convenience and economical efficiency.

BRIEF DESCRIPTION OF THE DRAWINGS

FIG. 6 is a schematic view illustrating a state in which a second highly transparent and high-refractive-index material is formed;

FIG. 7 is a table showing specifications of fine particles used in the embodiments of the present invention;

FIG. 8 is a table showing specifications of organic resin materials used in the embodiments of the present invention;

FIG. 9 is a table showing specifications of surfactants used in the embodiments of the present invention;

FIG. 10 is a table showing specifications of the tests respectively designated as "Dispersion System Nos. 1 to 20";

FIG. 11 is a table showing specifications of the comparative tests respectively designated as "Dispersion System Nos. 21 to 32";

FIG. 12 is a table showing the composition of the formed optical component and measured refractive indexes of the third example in which the fine particles are made of TiO2, and respective amounts of the fine particles and the surfactant are varied; and FIG. 13 is a table showing the composition of the formed optical component and measured refractive indexes of the fourth embodiment in which the fine particles are made of SiO2, and respective amounts of the fine particles and the surfactant are varied.

DESCRIPTION OF THE PREFERRED EMBODIMENTS

Figure 1:
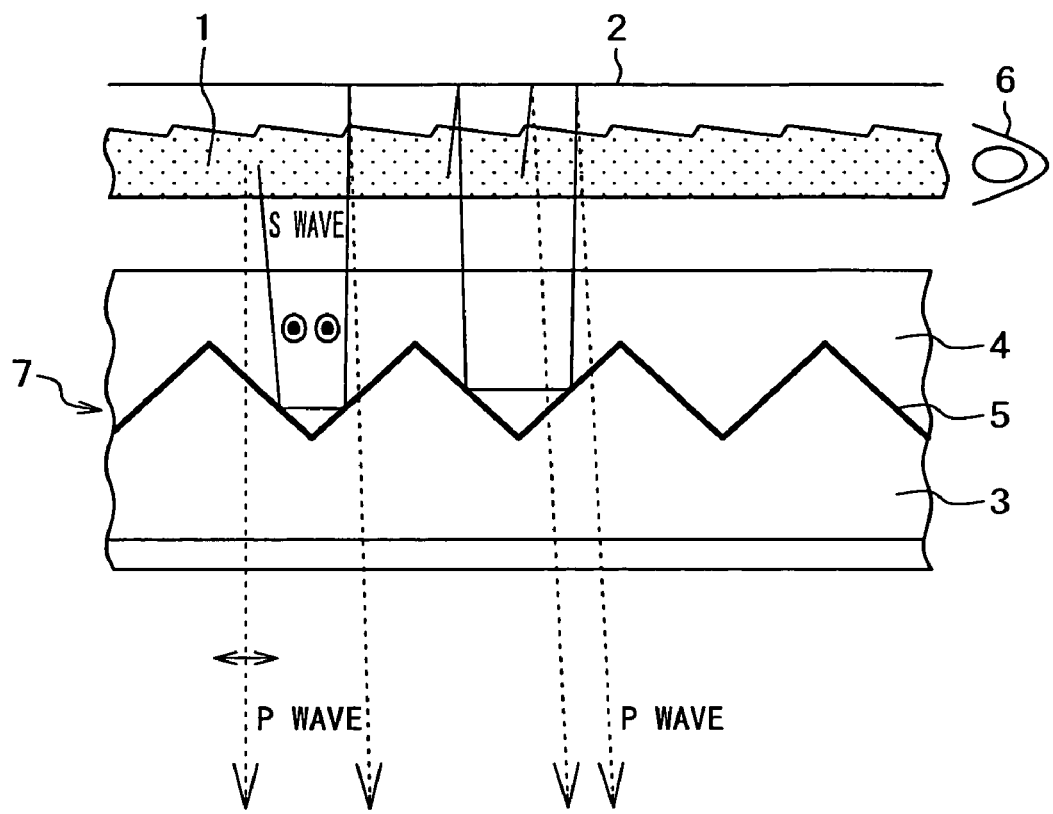
FIG. 1 is a sectional view illustrating the configuration of a polarization splitting device according to the invention.

Hereinafter, an embodiment of a fine particle dispersion composition according to the invention is described. Incidentally, the embodiment described hereinbelow is illustrative. The invention is not limited thereto.

(Fine Particle Dispersion Composition)

A fine particle dispersion composition according to the invention includes metal-oxide fine particles, an organic resin material adapted to cure by absorbing energy, one of a polyoxyethylene alkyl ether phosphoric acid-based surfactant and a polyoxyethylene alkyl ether carboxylic acid-based surfactant, each of which has a molecular weight of 500 or more, and an organic solvent. The fine particles are uniformly dispersed in the composition.

The fine particles are used for adjusting the refractive index of an optical component formed by curing the composition, and made of at least a metal oxide selected from the group consisting of $TiO_2$, ITO, $CeO_2$, $Y_2O_3$, IZO($In_2O_3$—ZnO), $ZrO_2$, ZnO, $Al_2O_3$, $SeO_2$, $SnO_2$, $Nb_2O_5$, and $Ta_2O_5$. In the case that the metal oxide is $TiO_2$, as above-mentioned, thereamong, when the composition is cured by irradiation of UV thereon, there is a fear that adverse effects are caused by absorbing and shielding UV energy. Thus, the composition according to the invention can be treated by both UV-curing and heat curing and show advantages when $TiO_2$ is used.

Fine particles, whose primary particle diameter is equal to or less than 0.03 μm, can be used. Thereamong, a group of fine particles, whose primary particle diameter ranges from 0.01 μm to 0.02 μm, or a group of fine particles, whose primary particle diameter ranges from 0.01 μm to 0.03 μm, can be used. Incidentally, in the case of acicular fine particles to be used by a wet method, those each having a minor axis length of 0.01 μm to 0.02 μm can be used. In a case where the particle diameter is within this range, the average particle diameter of fine particles in the fine particle dispersion composition, which include secondary agglomerated particles, can be suppressed by dispersion of fine particles in such a way as to be equal to or less than 0.03 μm. Consequently, a transparent optical component, which has a very small haze, can be obtained. Incidentally, the "average particle diameter" is defined herein as a particle diameter size that corresponds to a cumulative frequency of 50% from a small diameter side in a particle size distribution measurement.

Preferably, the content of fine particles in the fine particle dispersion composition is 20 vol % to 50 vol %. This is because of the facts that when the content thereof exceeds 50 vol %, the bonding strength of a cured resin becomes weak to the extent that the cured resin cannot be fit for practical use, and that when the content thereof is less than 20 vol %, the effect of adjusting the refractive index of an optical component, which is formed of the composition, is small. Incidentally, in the case of using $TiO_2$ fine particles, the content thereof may be 10 vol % to 50 vol % because even a small amount thereof has the effect of increasing the refractive index.

The organic resin material is at least an organic resin selected from the group consisting of a thermosetting resin, an energy ray curing epoxy resin, an energy ray acrylate resin, and an energy ray curing oxetane resin. The organic resin material causes curing reactions by absorbing energy. A heat curing, an ultraviolet (UV) ray curing resin, and an electron beam curing are cited as the types of the curing reactions.

The invention is preferable, especially, in that a thick optical component can be formed of a thermosetting epoxy resin. A same epoxy resin can be used in common as the base resin of a thick optical component and that of a thin optical component.

The thermosetting epoxy resin is a resin having at least one epoxy group, and has only to be at least one of, for example, 3,4-epoxycyclohexenylmethyl 3',4'-epoxy cyclohexane carboxylate, 1,2-epoxy-4-(2-oxiranyl)cyclohexane adduct of 2,2-bis(hydroxymethyl)-1-butanol, aromatic ring hydrogenation alicyclic epoxy resin, 2,2-bis(4-(2,3-epoxypropoxy)cyclohexyl)propane, and bis(2,3-epoxypropoxy cyclohexyl)methane. Especially, in a case of curing a thick film having a thickness of several μm to hundreds μm, in which high refractive index particles made of $TiO_2$ having high ultraviolet absorption power and shielding ability are dispersed, alicyclic epoxy resin, which excels in transparency and high-temperature and high-humidity environmental durability, is preferable as a transparent resin into which $TiO_2$ fine particles are dispersed (see "New Development of Epoxy Resin Curing Agent" ("Epokishi Reshin Kokazai no Shin-Tenkai"), CMC Publishing Co., Ltd, 1994, 32 and 127 pp.).

Also, one kind of acid anhydride selected from the group consisting of hexahydrophthalic anhydride, methyl hexahydro phthalic anhydride, 3,4-methyl hexahydro phthalic anhydride, and 4-methyl hexahydro phthalic anhydride may be added as epoxy resin curing agents.

Energy ray curing acrylic resin has only to be acrylic ester, for instance, dipentaerythritol hexaacrylate, pentaerythritol triacrylate, trimethylolpropane triacrylate, and tripropylene glycol diacrylate.

The energy ray curing oxetane resin may be, for example, 3-ethyl-3-hydroxy-methyl oxetane.

Preferably, the content of organic resin material consisting of a cured resin component and a surfactant is 25 vol % to 81 vol % of a component of the fine particle dispersion composition other than organic solvent.

The surfactant enhances the dispersibility of fine particles and has only to include at least one compound selected from the group consisting of polyoxyethylene oleyl ether phosphate, polyoxyethylene polyoxypropylene cetyl ether phosphate, and polyoxyethylene alkyl ether carboxylate, each of which has a molecular weight of 500 or more.

Only a specific surfactant can obtain good dispersion promoting effect on the combination of fine particles and an organic resin material according to the invention. The refractive index of the cured resin made by using alicyclic epoxy resin as a base member is mainly within a range of 1.5 to 1.55. A refractive index exceeding 1.8 is not reported. It is necessary for constituting a transparent resin, whose refractive index exceeds 1.6, to perform dispersion and mixing of $TiO_2$ ultrafine particles (for example, those of TTO series manufactured by Ishihara Sangyo Kabushiki Kaisha (primary particle sizes: 0.01 μm to 0.02 μm, 0.01 μm to 0.03 μm, 0.03 μm to 0.05 μm) having a high refractive index of 2.5 or 2.7 in such a transparent resin so that the particle size of the ultrafine particles is equal to or less than the wavelength of visible light. However, hitherto, it has been very difficult to disperse these fine particles in various energy curing resins, such as a UV curing resin and a heat cured resin, so that universally, these particles and resins are highly transparent. The invention has realized highly transparent dispersion of $TiO_2$ in an alicyclic epoxy resin, for the first time, by using a polyoxyethylene alkyl ether phosphoric acid-based surfactant or a polyoxyethylene alkyl ether carboxylic acid-based surfactant.

Preferably, the rate of the added surfactant to the organic resin material is 10 vol % to 50 vol %. This is because of the facts that when this rate exceeds 50 vol %, the bonding strength of a cured resin becomes weak to the extent that the cured resin cannot be fit for practical use, and that when the rate is less than 10 vol %, the effect of sufficiently promoting dispersion of fine particles cannot be obtained.

Preferably, the weight ratio of the added surfactant to the fine particles ranges from 0.043 to 1.1.

For example, methyl ethyl ketone, methyl isobutyl ketone, ethyl alcohol, or isopropanol are used as the organic solvent. From the viewpoint of promotion of the dispersion, preferably, methyl ethyl ketone or methyl isobutyl ketone is used as the organic solvent. Additionally, preferably, according to the condition of drying equipment, the organic solvent is suitably selected and the drying rate of the fine particle dispersion composition is adjusted after the fine particle dispersion composition is applied.

With the above configuration, fine particle dispersion composition according to the invention can be adapted so that fine particles are uniformly dispersed in this composition, and also can meet the following items.

(1) The particle size distribution of the dispersed fine particles is relatively small. The fine particles are dispersed so that the size of the dispersed particles becomes a primary particle size. The dispersed fine particles do not reaggregate at the stage of drying organic solvent.

(2) Coloring due to the surfactant after the dispersion and the curing does not occur.

(3) An amount of the surfactant to be added for promoting the dispersion of fine particles is relatively small. Thus, the influence of the surfactant on the value of the refractive index of the optical component after the curing thereof is small.

(4) A constituting part included as a constituent of the optical component after the curing thereof does not deteriorate high-temperature and high-humidity durability.

Also, the invention can provide a fine particle dispersion composition, which does not depend on specialty due to the curing method, that is, which does not depend upon the curing methods, such as a method of curing a thin film (hundred-odd nm or less) by irradiation of energy rays thereon and a method of curing a thick film (hundreds nm to hundreds μm), and which has adaptability to the curing methods and versatility. Especially, according to the fine particle dispersion composition, even in the case of curing a thick film having a thickness of hundreds μm or more, which high refractive index particles, such as $TiO_2$ particles, having high ultraviolet absorption power and shielding ability, favorable curing can be achieved without unevenness of curing and without thermal deformation. Thus, the invention can provide a high refractive-index optical component consisting of objective inorganic particles and an organic resin.

Also, the invention can provide a fine particle dispersion composition, which has high dispersion promotability and excels in connectivity between the organic resin base and each of the fine particles when the fine particles are dispersed in the organic resin material, for example, when the fine particles are dispersed into a thermosetting organic resin, such as an alicyclic epoxy resin.

The fine particle dispersion composition according to the invention can be applied to manufacture of all optical components having thicknesses in a range from that of a thin film (hundred-odd nm or less) to that of a thick film (hundreds nm to hundreds µm). Thus, the fine particle dispersion composition according to the invention is advantageous in convenience and economical efficiency of a manufacturing process. Heat curing is convenient for forming a 100-µm-thick high refractive index base member in such a manner as to have a large area. However, when low-refractive-index layers and high-refractive-index layers are alternately formed on the base member so that each of the layers has 20 nm to 200 nm, UV-curing is more convenient. When the layers of the fine particle dispersion composition are made of materials based on similar substances (that is, this composition has high adaptability to the curing methods and versatility), the affinity or adhesion between the layers is enhanced. Thus, enhancement in the yield and the reliability can be expected.

Manufacture of the fine particle dispersion composition has only to be conducted by performing a kneading process, a dispersion process, and a mixing process, which is provided before or after each of the kneading process and the dispersion process as needed. All the raw materials, such as the fine particles, the organic resin, the surfactant, and the organic solvent, may be added at the start or a midpoint of any of these processes. Moreover, the individual raw materials may be divided into those for two or more of the processes and added in the processes. When the dispersion and the mixing are performed, it is sufficient to put the raw material and high hardness metallic balls or ceramic balls are together, and to use a publicly known apparatus, such as an AJITER, or a paint shaker.

Incidentally, the particle size distribution at dispersion is improved by the fine particle dispersion composition, which excels in dispersibility and has adaptability to the curing methods and versatility. Also, the dispersion of the metal-oxide fine particles to the extent, in which the dispersed particles each have a primary particle size, is promoted. Thus, the filter filtration hitherto having been performed for removing large agglomerated particles is omitted. Consequently, the productivity can be enhanced.

(Optical Component)

Next, an embodiment of an optical component according to the invention is described.

An optical component according to the invention is obtained by curing a fine particle dispersion composition that includes metal-oxide fine particles, an organic resin material adapted to cure by absorbing energy, one of a polyoxyethylene alkyl ether phosphoric acid-based surfactant and a polyoxyethylene alkyl ether carboxylic acid-based surfactant, each of which has a molecular weight of 500 or more, and an organic solvent. That is, the optical component according to the invention is a highly transparent optical part configured in such a way as to uniformly disperse fine particles in the composition, and as to have a desired refractive index.

Also, the optical component according to the invention can be formed as an optical part having a given thickness, like a thick film having a thickness of hundreds nm to hundreds µm or a thin film having a thickness of hundred-odd nm or less. The optical component according to the invention can be formed into a desired shape like a coating, a film, a flat-plate, or a plate having a corrugated surface.

Thus, the invention can provide an optical component, which excels in environmental durability (that is, there is little change in optical characteristics, such as a transmissivity and a refractive index, under high temperature and high humidity conditions) by curing the fine particle dispersion composition according to the invention.

According to the invention, high-refractive-index and highly transparent materials can be produced by various molding methods. Thus, a multi-lens-array, a thin lens, and an advanced function optical device (a large area photonic crystal, a black screen, and soon) can be realized as examples of application of the optical component according to the invention. Even in the case of forming a thin optical layer, the invention is effective. Because of good dispersion, the invention can be applied to manufacture of an antireflection film and a black screen by a wet coating method.

Next, a method of manufacturing an optical component according to the invention is described.

The method of manufacturing an optical component according to the invention has a step of forming an optical component by applying the fine particle dispersion composition and evaporating organic solvent. Practically, this method is carried out by performing the following steps.

In step s1, a die member is used as the base member. Then, a predetermined amount of the fine particle dispersion composition, which is brought by adjusting the content of organic solvent into a liquid state or a gel state, is applied onto the die member. Then, a predetermined corrugated shape is formed on a surface of this die member thereby to produce an optical component having a desired surface shape.

Hitherto publicly known coating methods, such as gravure coating, roller coating, blade coating, die coating, and dipping, can be employed as the method of applying the composition. Alternatively, in the case of using the gelled fine particle dispersion composition, the composition may be applied in such a way as to be filled into the die member, so that the material is formed by embossing.

In step s2, the coated film made of the fine particle dispersion composition is dried to thereby evaporate organic solvent. Thereafter, the material is cured to thereby form an optical component having a predetermined thickness. Any of a heat curing method, a UV curing method, and an EB curing method may be employed. Incidentally, the heat curing method is suitable for forming a thick-film optical component, while the UV curing method is suitable for forming a thin-film optical component.

In step s3, in a case where the optical component is formed as, for example, a thick-film transparent base member, this optical component is peeled off the die member. At that time, preferably, a mold release agent is preliminarily applied to the die member.

Alternatively, a transparent base member is used as the die member. Then, a thin-film optical component is formed on the die member (or transparent base member). A resultant product may be used as a predetermined optical device that remains in a state in which the thin-film optical component is formed on the die member.

(Optical Film Laminate)

Next, an embodiment of an optical film laminate according to the invention is described.

An optical film laminate is constituted by stacking plural optical films that differ in refractive index from one another. At least one of the optical films is obtained by curing a fine particle dispersion composition that includes metal-oxide fine particles, an organic resin material adapted to cure by absorbing energy, one of a polyoxyethylene alkyl ether phosphoric acid-based surfactant and a polyoxyethylene alkyl ether carboxylic acid-based surfactant, each of which has a molecular weight of 500 or more, and an organic solvent.

Practically, the optical film laminate is configured by alternately stacking a high-refractive-index optical film (I), which is obtained by applying and curing a fine particle dispersion composition including an epoxy resin and $TiO_2$ fine particles according to the invention as a first optical film, and a low-refractive-index optical film (II), which is obtained by applying and curing a fine particle dispersion composition including an acrylic resin and $SiO_2$ fine particles according to the invention as a second optical film.

For example, the optical film (I) is set to have an optical thickness that is equivalent to a (¼) wavelength in a case where the wavelength is 550 nm. The optical film (II) is set to have an optical thickness that is equivalent to a (½) wavelength in the case where the wavelength is 550 nm. Then, a polarization splitting multilayer film (to be described later) can be provided by forming a seven-layer structure (the optical film (I)/the optical film (II)/the optical film (I)/the optical film (II)/the optical film (I)/the optical film (II)/the optical film (I)).

In addition, first, the optical film (I) is provided on the base member. Subsequently, the optical film (II) is provided thereon. Thereafter, the optical film (I) and the optical film (II) are alternately provided. Finally, the optical film (I) is provided. Thus, a laminate consisting of (2n+1) layers ("n" is an integer equal to or greater than 1). Alternatively, the laminate may be configured so that first, the optical film (II) is provided, and that thereafter, the optical film (I) and the optical film (II) are alternately provided.

In the above configuration, the optical film laminate is shaped like a large-area film. Thus, this optical film laminate can be applied to an antireflection film, a screen that is used for displaying an image represented by light, which is projected from a projector, that has high reflection characteristic of reflecting light of three wavelength bands respectively corresponding to red, green, and blue, at a high degree, and that also has a high transmission characteristic of transmitting light of a visible wavelength range other than the wavelength bands and various kinds of optical filters, a protecting film, an angle-of-view control film.

For example, the fine particle dispersion composition (a mixture of a polyoxyethylene alkyl ether phosphoric acid-based surfactant and inorganic fine particles) according to the invention is effective from the viewpoint of good affinity between a resin basis material and each of the inorganic fine particles and the uniform dispersibility even in the case that the inorganic fine particles are spherical fine particles of a uniform size according to the wavelength of light having each of the colors. That is, alicyclic epoxy resin, in which the polyoxyethylene alkyl ether phosphoric acid-based surfactant is mixed, and $TiO_2$ spherical particles having a refractive index of 2.7 are uniformly dispersed. Then, dipping coating, drying (in this case, the film is thin, so that either UV-curing or heat curing can be employed), and curing are performed. Thus, $TiO_2$ spherical particles having a refractive index of 2.7 can be arranged in the resin basis material having a refractive index of 1.52. Also, application of the dispersed system of the invention to a case, in which fine glass spheres having a high refractive index are arranged in a UV-cured acrylic resin, and in which this composition is applied, enables similarly good dispersion.

In a case of considering a reflection screen consisting of three layers, in each of which $TiO_2$ fine spheres having a refractive index of 2.7 are arranged, corresponding to the wavelengths (450 nm, 550 nm, 650 nm) of blue, green, and red as a practical example, it is effective to perform closest packing and arranging spheres each having a diameter of 117 nm in a thermosetting resin having a refractive index of 1.52 in a reflection layer for blue. Also, it is effective to perform closest packing and arranging spheres each having a diameter of 143 nm in a thermosetting resin having a refractive index of 1.52 in a reflection layer for green. Moreover, it is effective to perform closest packing and arranging spheres each having a diameter of 169 nm in a thermosetting resin having a refractive index of 1.52 in a reflection layer for red. In the case of making the reflection screen having three layers as a basic constituent, the combination of the surfactant and the resin according to the invention is suitable for forming uniform reflection layers, because the bonding strength of each of the layers is large and the resin dispersion is good.

When the optical film laminate according to the invention is manufactured, the optical films are formed, similarly to the method of manufacturing the optical component. An example thereof is described hereinbelow.

In step s11, a predetermined amount of fine particle dispersion composition A for a high refractive index among fine particle dispersion composition according to the invention is applied onto a principal surface of the base member.

In step s12, after the film obtained by applying the fine particle dispersion composition A is dried, this film is cured by being irradiated with ultraviolet rays, thereby to form an optical film (I) having a predetermined thickness.

In step s13, subsequently, a predetermined amount of fine particle dispersion composition B for a low refractive index is applied onto the optical film (I).

In step s14, after the film obtained by applying the fine particle dispersion composition B is dried, this film is cured by being irradiated with ultraviolet rays, thereby to form an optical film (II) having a predetermined thickness. Thus, a stack configuration, in which the optical film (I) and the optical film (II) are stacked, is obtained.

In step s15, subsequently, a predetermined amount of fine particle dispersion composition A is applied on the optical film (II) that is an outermost layer on the base member.

In step s16, after the film obtained by applying the fine particle dispersion composition A is dried, this film is cured by being irradiated with ultraviolet rays, thereby to form an optical film (I) having a predetermined thickness. Thereafter, the process of steps s13 to s16 is performed a predetermined number of times. Thus, an optical film laminate is formed on the base member.

(Polarization Splitting Device)

Next, an embodiment of a polarization splitting device according to the invention is described.

FIG. 1 shows the configuration of a polarization splitting device according to the invention.

A polarization splitting device 7 is a plate made of a resin having a high refractive index, and comprises a first highly transparent high-refractive-index member 3 that is a mode of a transparent base member having inclined plane surfaces, which are formed on one of sides of the plate by grooving and differ in inclination direction from and face each other, a polarization splitting multilayer film 5 formed on the inclined plane surface of the first highly transparent high-refractive-index member 3, and a second highly transparent high-refractive-index member 4 that is a mode of the transparent base member formed of a high-refractive-index material 4 in such a way as to fill the grooves of the first highly transparent high-refractive-index member 3. The polarization splitting multilayer film 5 is formed between interfaces of the first highly transparent high-refractive-index member 3 and the second highly transparent high-refractive-index member 4. The first highly transparent high-refractive-index member 3, the polarization splitting multilayer film 5, and the second highly transparent high-refractive-index member 4 are formed in the shape of a flat plate. Incidentally, the Japanese Patent Application No. 2002-073157 for the invention relating to the polarization splitting device of this configuration was already filed by the same applicant as that of the present application.

According to the present invention, each of the first highly transparent high-refractive-index member 3 and the second highly transparent high-refractive-index member 4 is a transparent base member obtained by curing a fine particle dispersion composition according to the invention, which includes metal-oxide fine particles, an organic resin material adapted to cure by absorbing energy, one of a polyoxyethylene alkyl ether phosphoric acid-based surfactant and a polyoxyethylene alkyl ether carboxylic acid-based surfactant, each of which has a molecular weight of 500 or more, and an organic solvent.

Each of the inclined plane surfaces, which are formed in each of the first highly transparent high-refractive-index member 3 and the second highly transparent high-refractive-index member 4 and differ in the inclination direction from and face each other, has an inclination angle of 45 degrees with respect to a substrate surface (a horizontal surface, as viewed in the figure). The inclined plane surfaces are alternately and repeatedly formed.

The polarization splitting multilayer film 5 has functions of transmitting only one of linearly polarized light rays, whose polarization planes are orthogonal to each other, and reflecting the other linearly polarized light ray. The polarization splitting multilayer film 5 is constituted by an optical film laminate of a structure $(HL)_m$ or $(0.5H \ L \ 0.5H)_m$ (incidentally, "m" is an integer equal to or more than 3), in which a high-refractive-index optical film H and a low-refractive-index optical film L, each of which has an optical film thickness nearly equal to (¼) the reference wavelength $\lambda_0$ of incident light, are alternately formed.

Alternatively, the polarization splitting multilayer film 5 may be an optical film laminate that is constituted by transparent high-refractive-index optical films H and a transparent low-refractive-index optical films L, each of which has a predetermined refractive index with respect to incident light, and that has one of structures $(H2L)_m$, $(H2L)_mH$, or $2L(H2L)_m$ ((incidentally, "m" is an integer ranging from 3 to 7). Even this optical laminate favorably functions as the polarization splitting multilayer film by setting each of the optical films H and L to have an optical film thickness nearly equal to (¼) the reference wavelength $\lambda_0$ of incident light.

At least one of layers respectively constituted by the optical films of the polarization splitting multilayer film 5 has only to be an optical film obtained by curing the above-mentioned fine particle dispersion composition according to the invention, which includes metal-oxide fine particles, an organic resin material adapted to cure by absorbing energy, one of a polyoxyethylene alkyl ether phosphoric acid-based surfactant and a polyoxyethylene alkyl ether carboxylic acid-based surfactant, each of which has a molecular weight of 500 or more, and an organic solvent.

Alternatively, for example, a $TiO_2$ film may be used as the high-refractive-index optical film, while a $SiO_2$ film may be used as the low-refractive-index optical film. The $TiO_2$ films and the $SiO_2$ films may be formed by a reactive dual-magnetron sputtering method using Ti-target or Si-target in oxygen environment.

FIG. 1 illustrates how light rays pass through the polarization splitting device 7 according to the invention. Light rays, whose light source is a lamp light source 6, outputted from a light guiding plate 1 includes P-polarized waves and S-polarized waves. The polarization splitting device 7 allows only the P-polarized waves to pass therethrough, and reflects and returns the S-polarized waves to the light guiding plate 1. Subsequently, the returned S-polarized waves repeat reflection in the light guiding plate 1. Thereafter, only light, which becomes P-polarized waves, can passes through the polarization splitting device 7 again. Thus, only the P-polarized waves are supplied to a liquid crystal device (LCD) unit placed in front of the polarization splitting device 7. This can enhance the brightness of the LCD unit.

Next, a method of manufacturing the polarization splitting device according to the invention is described by referring to FIGS. 2 to 6.

Figure 2:
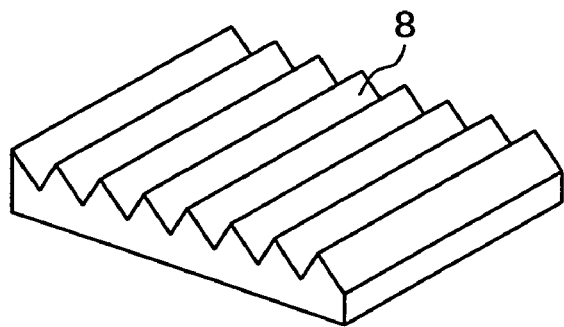
FIG. 2 is a schematic view illustrating the configuration of a die for forming a highly transparent and high-refractive-index material that is a transparent base member.
Figure 3:
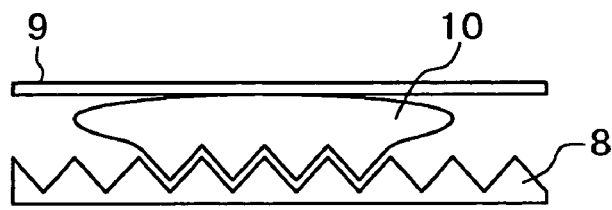
FIG. 3 is a schematic view illustrating a state in which the die is filled with a fine particle dispersion composition.

In step s21, a metal mold 8, which is a mode of the die member shown in FIG. 2 and provided with 45-degree grooves (the pitch thereof: 0.1 mm), is prepared. Then, fluorine releasing is performed on the 45-degree groove surfaces. Thereafter, the grooves are filled with the fine particle dispersion composition according to the invention. Viscous liquid (the gelled fine particle dispersion composition) obtained by drying organic solvent thereof having, for instance, the following ingredients in such a way as to reduce an amount of the organic solvent to one-fifth thereof is used as the fine particle dispersion composition according to the invention.

(1) Fine Particles: Surface Repellent $TiO_2$ Fine Particles (Tradename: TTO-51(A) manufactured by Ishihara Sangyo Co., Ltd.) 9 wt %

(2) Organic Resin Material:
   Alicyclic Epoxy Resin (1):
3,4-epoxycyclohexenylmethyl 3',4'-epoxy cyclohexane carboxylate (Tradename: CEL2021P manufactured by Daicel Chemical Industries, LTD.) 1 wt %
   Alicyclic Epoxy Resin (2):
2,2-epoxy-4-(2-oxiranyl)cyclohexane adduct of 2,2-bis(hydroxymethyl)-1-butanol (Tradename: EHPE3150 manufactured by Daicel Chemical Industries, Ltd.) 1 wt %
   Acid Anhydride: 4-methyl hexahydro phthalic anhydride (Tradename: MH-700 manufactured by New Japan Chemical Co., Ltd.) 2 wt %

(3) Surfactant: polyoxyethylene oleyl ether phosphate (oleth-10 phosphate) (Tradename: Crodafos N10A manufactured by Croda Japan Co., Limited.) 2 wt %

| | |
|---|---|
| (4) Organic Solvent: methyl ethyl ketone | 85 wt % |

In step s22, uncured fine particle dispersion composition 10 is extended on the grooves of the metal mold 8 (FIG. 3) by using transparent flat-face substrate 9. Then, heating is performed thereon at a temperature of 60° C. for 60 minutes to thereby put the composition into a dry state.

Figure 4:
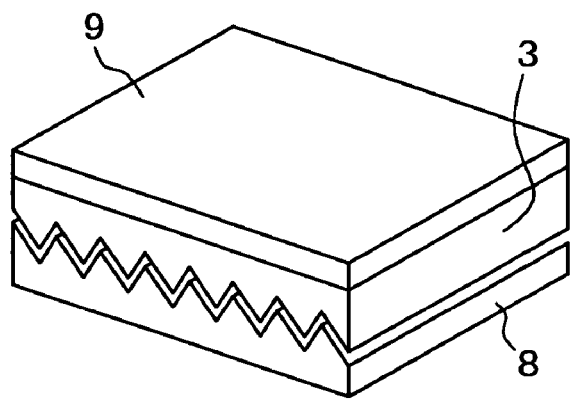
FIG. 4 is a schematic view illustrating a state in which a first highly transparent and high-refractive-index material is formed.

In step s23, the dried fine particle dispersion composition 10 is peeled off the metal mold 8. Then, heat-curing is first performed thereon at a temperature of 60° C. for 60 minutes. Subsequently, heat-curing is first performed thereon again at a temperature of 100° C. for 5 hours. Thus, the first highly transparent high-refractive-index member 3 is obtained (FIG. 4).

Figure 5:
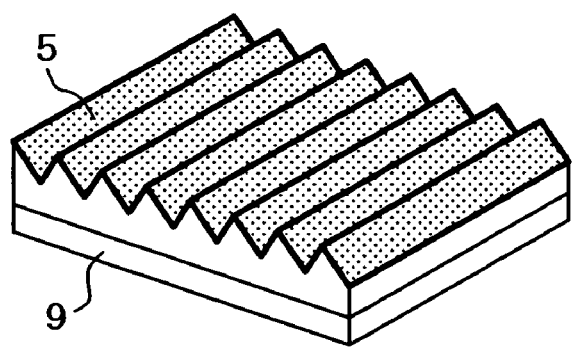
FIG. 5 is a schematic view illustrating a state in which a polarization splitting multilayer film is formed in the transparent base member.

In step s24, a polarization splitting multilayer film 5 is formed on the surfaces of the 45-degree grooves of the completed first highly transparent high-refractive-index member 3 (FIG. 5). As above-mentioned, the polarization splitting multilayer film 5 may be an optical film laminate obtained by applying and curing the fine particle dispersion composition according to the invention. Alternatively, the polarization splitting multilayer film 5 may be an optical film laminate obtained by sputtering. When the first highly transparent high-refractive-index member 3 is 1.8, $TiO_2$ film H (55.9 nm in thickness) having an optical thickness corresponding to (¼) wavelength, which is 550 nm, and $SiO_2$ film L (188.4 nm in thickness) having an optical thickness corresponding to (½) wavelength, which is 550 nm, have only to be stacked in the order of the films H, 2L, H, 2L, H, 2L, and H, so that a film of a seven-layer structure is obtained.

In step s25, the grooves having surfaces, on which the polarization splitting multilayer film 5 of the first highly transparent high-refractive-index material is formed, are filled with the fine particle dispersion composition according to the invention, similarly to steps s21 to s23. Then, drying and during are performed thereon to thereby obtain a second highly transparent high-refractive-index member 4 (FIG. 6). Incidentally, in this case, release-agent processing is performed only on a flat-face substrate side on which the fine particle dispersion composition is extended.

There is less thermal deformation in the completed polarization splitting device 7, as compared with the prior art using the material obtained by dispersing $TiO_2$ in the UV cured resin. This is because there is no need for performing UV irradiation for a long time. Also, uniform distribution of transmittance of light, whose amount is obtained as that of converted P-polarized light, can easily be obtained, as compared with the prior art. This is because the optical characteristic is uniform among the inner parts and the neighborhood of the surface of the highly transparent high-refractive-index members 3 and 4. When comparison is made therebetween on condition that the transmittance of P-polarized light is equal to or more than 90%, the yield of the polarization splitting device according to the invention is twice or more that in the case of the prior art. Thus, the invention can obtain considerable increase in the yield.

As above-mentioned, according to the invention, favorable curing without curing unevenness and thermal deformation is enabled even when a thick film having a thickness of hundreds μm or more and including $TiO_2$ particles, whose refractive index, UV absorptivity and shielding ability are large, is obtained by curing. Thus, the invention reduces unevenness in the resin characteristic, which is caused by the difference in the curing characteristic between the cured deep part and the cured neighborhood of the surface in the case of the prior art mainly employing the energy ray curing. Also, the invention can increase the yield of the completed device, such as the polarization splitting device. Moreover, according to the invention, an optical component made of a thick material, which has a high refractive index of 1.8 or more, can be produced by a method similar to a resin molding, though such an optical component has been usually produced by using a glass material.

Thus, an optical component needing a large area can be manufactured at low cost, as compared with the prior art using glass materials. Consequently, the invention can widely contribute to developed optical technology and optical industry. Incidentally, according to the invention, optical components, whose refractive indexes are equal to or higher than 1.7, can easily be formed by the combination of alicyclic epoxy resin and $TiO_2$ fine particles.

The fine particles used according to the invention are not limited to $TiO_2$ ones. Other various metal-oxide fine particles can be used.

Incidentally, the polarization splitting multilayer film 5 itself may be constituted by using the high-refractive-index layer and the low-refractive-layer, which are made of the fine particle dispersion composition according to the invention. Alternatively, the polarization splitting multilayer film 5 may be formed as follows. That is, a layer obtained by filling the epoxy resin with $TiO_2$ fine particles is used as the high-refractive-index layer. A layer obtained by adding $SiO_2$ particles and $MgF_2$ particles to epoxy resin is used as the low-refractive-index layer. Then, a process of applying of the composition and drying thereof at a temperature of 60° C. is repeatedly performed on each of the layers. Finally, heat-curing at a temperature of 100° C. to 120° C. is simultaneously performed thereon.

Also, the base members of the highly transparent high-refractive-index members 3 and 4 and the high-refractive-index thin films and the low-refractive-index thin films of the polarization splitting multilayer film 5 are made by commonly using the fine particle dispersion composition that has adaptability to the curing methods and versatility. Thus, the base members and the thin film layers are made of materials based on similar substances. Consequently, the affinity or adhesion therebetween becomes favorable. Especially, even when a thermosetting resin is used as the material of the thick film base member and a UV cured resin is used as the material of the thin film, favorable adhesion strength can be obtained, because the surfactant is based on similar substances.

EXAMPLES

Practical examples of practicing the invention are described hereinbelow. This example is illustrative. The invention is not limited to this example.

FIG. 7 to FIG. 9 show specifications of fine particles, organic resin materials, and surfactants used in the examples. Components in each of the examples are designated by signs.

Four kinds of $TiO_2$ fine particles, that is, surface hydrophobic and surface repellent $TiO_2$ ones manufactured by a baking method, and hydrophobic and surface repellent $TiO_2$ ones manufactured by a wet method were used as the fine particles (FIG. 7).

Various kinds of cured resin materials, that is, alicyclic epoxy resin, oxetane resin, and acrylic resin were appropriately used as the organic resin materials (FIG. 8).

Anionic, nonionic, cationic surfactants and various combinations thereof were used (FIG. 9).

Methyl ethyl ketone (MEK) was used as the organic solvent. However, similar results were obtained even when methyl isobutyl ketone, ethyl alcohol, isopropanol, toluene, cyclohexane or the like were used. From the viewpoint of promotion of dispersion, methyl ethyl ketone methyl and isobutyl ketone were particularly effective.

First Example

Components of the fine particle dispersion composition according to first example of the invention and a manufacturing method therefore are described hereinbelow (1) Components of Fine Particle Dispersion Composition

| | |
|---|---|
| Fine Particles: T-1 | 9 wt % |
| Organic Resin Materials: | |
| R-1 | 2 wt % |
| R-6 | 2 wt % |
| Surfactant: A-7 | 2 wt % |
| Organic Solvent: MEK | 85 wt % |

(2) Method of Manufacturing Fine Particle Dispersion Composition

The above-mentioned components were weighed at the above-mentioned ratios. Then, the components were mixed together with ceramic balls (0.1 mm in diameter), which was made mainly of $ZrO_2$ and had an amount corresponding to 200% the total amount of the above-mentioned components. Thereafter, these were inputted into a polyethylene bottle container, which was then put into a mixing shaker. Thereafter, dispersion and mixing were performed until the dispersion was sufficiently achieved. Incidentally, it took 20 hours until the dispersion was sufficiently achieved.

(3) Formation of Optical Component and Evaluation

The fine particle dispersion composition completed in this way was applied onto a mirror polished and finished silicon monocrystal substrate by changing a lifting speed while a dipping/lifting method was performed. Then, a thin film optical component was produced by drying and heat-curing the composition at a temperature of 100° C. for 5 hours. Although both of a method of repeatedly performing dip-coating and drying at a temperature of 60° C. on the composition and a method of applying the fine particle dispersion composition after the viscosity of the composition was increased by drying the composition in a wet ambient atmosphere, in which the humidity of MEK vapor was equal to or higher than 70%, until the volume of the composition was reduced to about (⅓) to (¹/₁₀) that thereof can be applied to formation of a thick film optical component, the latter method was performed in this case to form each single layer, which was 1 μm to 100 μm in thickness and made of the same material. The optical component obtained by such a method was employed as a test piece. The refractive index of the test piece was measured by an ellipsometer.

(4) Result

The mean particle diameter (that is, a particle diameter size corresponding to a cumulative frequency of 50% from a small diameter side in a particle size distribution measurement) of the fine particle dispersion composition obtained by manufacture thereof was found to be 0.22 μm by performing the particle size distribution measurement through the use of a particle size distribution measuring device.

As a result of formation of an optical component by the dipping/lifting method using the obtained fine particle dispersion composition, an optical component having a film thickness of 50 nm to 1 μm was obtained by adjusting the lifting speed while the dipping/lifting method was performed. Moreover, an optical component, whose film thickness was 1 μm to 100 μm, was produced by performing the method of applying the fine particle dispersion composition after the viscosity thereof was increased. Additionally, these optical components were highly transparent. The refractive index n of these optical components was 1.81.

As above-mentioned, according to the invention, $TiO_2$ fine particles could be dispersed in the organic resin material in such a way as to be highly transparent. Thus, not only thin film high-refractive-index optical components but thick layer high-refractive-index optical components, whose thicknesses were several μm to hundreds μm, could be formed.

Second Example

Dispersion and mixing were performed on the fine particle dispersion composition according to the invention or a part thereof by changing the component and performing a process similar to that performed in the case of the first example. Thus, dispersion tests were performed on the fine particles. FIG. 10 shows specifications of the tests respectively designated as "Dispersion Nos. 1 to 20". Incidentally, the specification of the test "Dispersion No. 1" is that of the test performed on the first example. Then, dispersion and mixing were performed on fine particle dispersion compositions, which were other than that used in the case of the example and employed as comparative examples, by performing a process similar to the process performed in the case of the first example. Thus, dispersion tests on fine particles thereof were conducted. FIG. 11 shows the specifications of such tests respectively designated as "Dispersion Nos. 21 to 32".

Also, the dispersibility of fine particles of each of the dispersion system Nos. was measured by the particle size distribution measuring device. Consequently, in a case where the dispersion was evaluated as being uniform dispersion, and where the mean particle diameter was equal to or less than 0.03 μm, a result of such evaluation is designated by ○. In a case where the dispersion was evaluated as being uniform dispersion, and where the mean particle diameter was larger than 0.05 μm, a result of such evaluation is designated by Δ. In a case where the dispersion was evaluated as not being a uniformly dispersed composition, and where the composition was divided into an upper layer and a lower layer in the case of still standing, a result of such evaluation is designated by X. Moreover, the transparency of a film in the case of formation of the film was visually evaluated. In a case where a transparent optical component was made, the result of the evaluation is designated by ○. In a case where a transparent optical component was not made, the result of the evaluation is designated by X. At that time, UV-curing was performed on the fine particle dispersion composition including an organic resin material R-8 or R-9.

In FIG. 10, in the case of the dispersion systems Nos. 2, 3, and 4, the combination of R-1 (2 wt %) and R-6 (2 wt %) was used as the thermosetting epoxy resin material. It was verified what differences are caused in dispersion results by the differences in the method of making $TiO_2$ power (9 wt %) and in the surface nature. In the case of the dispersion systems Nos. 2 to 4, favorable dispersion was realized by addition (2 wt %) of polyoxyethylene oleyl ether phosphate (the surfactant A-7), regardless of the difference in the surface nature of the $TiO_2$ powder (9 wt %) similarly to the case of the dispersion system No. 1.

Regarding the dispersion systems Nos. 5, 7, and 8, the organic resin material R-6 serving as an epoxy resin curing agent was added to each of the organic resin material R-2 in the case of the dispersion system No. 5, the organic resin material R-4 in the case of the dispersion system No. 7, and the organic resin material R-5 and another kind alicyclic epoxy resin in the case of the dispersion system No. 8. Then, the effects of mixing and dispersion of the surfactant A-7 and $TiO_2$ fine particles in each of these dispersion systems were verified. Also, in the case of the dispersion system No 6, the organic resin material R-3 was mixed with the organic resin material R-7 and methyl ethyl ketone. Then, the effects of mixing and dispersion of $TiO_2$ fine particles at the addition of the surfactant A-7 thereto were verified.

Consequently, it was verified that the addition of polyoxyethylene oleyl ether phosphate was effective in realizing good dispersion of these alicyclic epoxy resins and $TiO_2$ fine particles. An example of a commercial product of polyoxyethylene oleyl ether phosphate used herein had the Tradename Crodafos N10A (the surfactant A-7) manufactured by Croda Japan Co., Ltd., and also had a molecular weight of 796.

Regarding the dispersion system Nos. 9 and 18, effects of addition of polyoxyethylene alkyl ether phosphoric acid-based surfactant to the dispersion system composition of photopolymerized acrylic monomer and $TiO_2$ fine particles were studied.

This study was performed on the combination of the organic resin material R-9 and the surfactant A-7 in the case of the dispersion system No. 9 and on the combination of the organic resin material R-9 and the surfactant A-8 in the case of the dispersion system No. 18. Consequently, good dispersion was obtained, in which the mean particle diameter was equal to or less than 0.03 μm. Thus, it was found that the effect of the addition of polyoxyethylene alkyl ether phosphoric acid-based surfactant was effective even in the case of the dispersion of the acrylic monomer. In the case of the dispersion of only acrylic monomer and $TiO_2$ fine particles, the mean particle diameter was neither equal to or less than 0.05 μm (this is not shown in FIG. 10). However, the composite and favorable dispersion mode was realized among acrylic monomer molecules, $TiO_2$ fine particles, and the polyoxyethylene alkyl ether phosphoric acid-based surfactant by adding the polyoxyethylene alkyl ether phosphoric acid-based surfactant to the acrylic monomer and the $TiO_2$ fine particles. Consequently, the mean particle diameter equal to or less than 0.03 μm was realized. The invention is effective in the case that the acrylic monomer is epoxy acrylate and that the acrylic monomer is urethane acrylate.

Incidentally, in the case of each of the dispersion systems Nos. 9 and 18, 0.2 wt % of a photoinitiator (the tradename IRGACURE 184 manufactured by Ciba Specialty Chemicals Co., Ltd.) was mixed thereinto after the dispersion of $TiO_2$ fine particles. Then, applying and drying of the composition and UV irradiation thereon were performed. Even the addition of the photoinitiator thereto was performed, the favorable mixing and dispersion were maintained. Consequently, the curing of favorably highly transparent material could be performed.

Regarding the dispersion systems Nos. 10 and 17, the influence of difference in the molecular weight of the polyoxyethylene alkyl ether phosphoric acid-based surfactant was studied.

In the column of the dispersion system No. 10, the result of using polyoxyethylene oleyl ether phosphoric acid (the surfactant A-6) is shown. In the column of the dispersion system No. 17, the result of using polyoxyethylene polyoxypropylene cetyl ether phosphoric acid is shown. Oxyethylene included in the molecule of the surfactant A-7 is $(CH_2CH_2O)_{10}$. In the case of the surfactant A-6, the number of repetition is reduced a little. Oxyethylene included in the molecule of the surfactant A-6 is $(CH_2CH_2O)_3$. In the case of each of the dispersion system Nos. 10 and 17, the dispersion, in which the mean particle diameter was equal to or less than 0.03 μmm, was achieved. However, in the case of using the surfactant A-6, whose molecular weight was 500, a time taken to achieve the favorable dispersion was a little bit longer. When the molecular weight thereof was equal to or less than 300, uniform dispersion was achieved, whereas the mean particle diameter was larger than 0.05 μm. Therefore, preferably, the molecular weight of polyoxyethylene alkyl ether phosphoric acid-based surfactant is 500 or more. More preferably, the molecular weight thereof is 600 or more, from the viewpoint of reduction in the time taken to reach the favorable dispersion.

Regarding the case of the dispersion system Nos. 11, 12, and 14, the effects of addition of polyoxyethylene alkyl ether phosphoric acid-based surfactant in the mixing and dispersion of $TiO_2$ fine particles and a mixture of an oxetane resin and an alicyclic epoxy resin were studied. Comparing a case, in which only an oxetane resin and $TiO_2$ fine particles are mixed, with the case of the combination of an oxetane resin (the organic resin material R-8), $TiO_2$ fine particles, and polyoxyethylene alkyl ether phosphoric acid-based surfactant (the surfactant A-7), there were found evident dispersion promotion effects of the addition of a polyoxyethylene oleyl ether phosphoric acid. Additionally, even in a case where an oxetane resin and an alicyclic resin were mixed (in the case of the dispersion system No. 11, the organic resin materials R-1 and R-8 and the surfactant A-7, and in the case of the dispersion system No. 11, the organic resin materials R-1, R-2 and R-8 and the surfactant A-7), there were found evident dispersion promotion effects of the addition of a polyoxyethylene oleyl ether phosphoric acid.

Incidentally, in the case of the dispersion systems Nos. 11, 12, and 14, 0.2 wt % of a photoinitiator (the tradename Uvacure 1591 manufactured by Daicel UCB Co., Ltd.) was mixed thereinto after the dispersion of $TiO_2$. Then, applying and drying of the composition and UV irradiation thereon were performed. Even the addition of the photoinitiator thereto was performed, the favorable mixing and dispersion were maintained. Consequently, the curing of favorably highly transparent material could be performed.

In the case of the dispersion systems Nos. 15 and 16, the dispersion promotion effects of polyoxyethylene alkyl ether phosphoric acid-based surfactant on elemental alicyclic epoxy resin and elemental acid anhydride serving as an epoxy resin curing agent were studied.

The dispersion system No. 15 corresponds to the case of the combination of only alicyclic epoxy resin (the organic resin material R-1), a polyoxyethylene oleyl ether phosphoric acid (the surfactant A-7), and $TiO_2$ fine particles, while the dispersion system No. 16 corresponds to the case of the combination of only an acid anhydride (the organic resin material R-6) serving as an epoxy resin curing agent, a polyoxyethylene oleyl ether phosphoric acid (the surfactant A-7), and TiO$_2$ fine particles. As is understood from comparison with the dispersion system Nos. 28 and 29 (respectively corresponding to the combination of only the organic resin material R-1 and TiO$_2$ fine particles and the combination of an acid anhydride (the organic resin material R-6) serving as an epoxy resin curing agent, and TiO$_2$ fine particles, see FIG. 11), which are the comparative example, the favorable dispersion (the mean particle diameter is equal to or less than 0.03 μm) can be achieved only when a polyoxyethylene oleyl ether phosphoric acid coexists.

The dispersion systems Nos. 19 and 20 (FIG. 10), which are the examples, are compared with the dispersion system Nos. 31 and 32 (FIG. 11), concerning polyoxyethylene alkyl ether surfactants other than phosphoric acid-based surfactants.

Both surfactants A-10 and a-11 are sodium. The molecular weight of each of the surfactants A-10 and a-11 is about 400 to 500. When polyoxyethylene alkyl ether sulfate (the surfactant A-10) in the case of the dispersion system No. 31 was singly added, favorable dispersion was not obtained. Conversely, when polyoxyethylene alkyl ether carboxylate (the surfactant A-11) in the case of the conversion system No. 19 was simply added, favorable dispersion was obtained.

Moreover, when a higher alcohol (the surfactant A-12) having a molecular weight of 730 in the case of the dispersion system No. 32 was simply added, favorable dispersion was not obtained. Conversely, when a polyoxyethylene oleyl ether phosphoric acid and polyoxyethylene alkyl ether sulfate (the surfactants A-7 and A-10) in the case of the dispersion system No. 20 are simultaneously added, favorable dispersion due to the effect of the polyoxyethylene oleyl ether phosphoric acid was maintained.

As is understood from these facts, polyoxyethylene alkyl ether phosphoric acid-based or polyoxyethylene alkyl ether carboxylate surfactant provides favorable dispersion.

FIG. 11 shows results of study of surfactants other than polyoxyethylene alkyl ether phosphoric acid-based surfactants in the case of the dispersion systems Nos. 21 to 17 and 30.

Although lauroyl sarcosine sodium (the surfactant A-2) having a molecular weight of 280 in the case of the dispersion system No. 21 serving as an anionic surfactant was studied, the dispersion was not good.

Regarding the dispersion systems Nos. 26, 27, 30, sodium dodecyl benzenesulfonate (the surfactant A-1) was used as an anionic surfactant. The dispersion in the case of the combination of sodium dodecyl benzenesulfonate and each of an alicyclic epoxy resin (the organic resin material R-1), an acid anhydride epoxy resin curing agent (the organic resin material R-6), and an alicyclic epoxy resin and an acid anhydride epoxy resin curing agent (the organic resin materials R-1 and R-6). However, in all of the cases of these combinations, no favorable dispersions (the mean particle diameter was equal to or less than 0.03 μm) were obtained.

In the case of the dispersion system No. 22, although quaternium-91, which is a cationic surfactant and has a molecular weight of 680, cetrimonium methosulfate, cetearyl alcohol (the surfactant A-9) were studied, favorable dispersion wan not obtained.

In the case of the dispersion systems Nos. 23 to 25, although sorbitan monooleate (the surfactant A-3), sorbitan trioleate (the surfactant A-4), and polyoxyethylene sorbitan trioleate (the surfactant A-5 having a molecular weight of 880) were studied as nonionic surfactants, favorable dispersion wan not obtained.

As was seen from the above-mentioned results, in the case that the mean particle diameter after dispersed was equal to or less than 0.03 μm, transparent materials was obtained after drying and curing. However, in the case that the mean particle diameter was equal to or more than 0.05 μm, no transparent materials were obtained. Thus, it is necessary for obtaining highly transparent materials that the mean particle diameter of 0.03 μm or less is realized.

The above-mentioned results reveals that when the uniform and fine dispersion of TiO$_2$ fine particles in a cured organic resin material is performed, the addition of a polyoxyethylene alkyl ether phosphoric acid-based surfactant and a polyoxyethylene alkyl ether carboxylate, each of which has a molecular weight of 500 or more, are extremely effective. It is considered that good affinity between TiO$_2$ and each of a polyoxyethylene alkyl ether phosphoric acid-based surfactant and a polyoxyethylene alkyl ether carboxylate and the somewhat large and long shape of a molecule having a molecular weight of 500 or more promote molecular level interlacement thereof with the skeleton of another cured organic resin, such as an alicyclic epoxy resin, and that consequently, the addition of a polyoxyethylene alkyl ether phosphoric acid-based surfactant and a polyoxyethylene alkyl ether carboxylate provides the favorable dispersion of TiO$_2$ fine particles.

According to the invention, for example, even when a antireflection layer is produced by alternately and repeatedly forming a high refractive-index layer and a lower refractive-index layer, final curing at a temperature of 100° C. to 120° C. can be performed after a four-layer structure consisting of a high refractive index layer, a low refractive index layer, a high refractive index layer, and a low refractive index layer, arranged in this order from a substrate side is formed by applying only an alicyclic epoxy resin onto the low refractive index layer without being mixed with TiO$_2$ and drying at a temperature of 60° C. in an intermediate time between the formations of adjacent two of the high refractive index layer and the low refractive index layer. Consequently, the invention has large effect on reduction in the manufacturing cost of the optical film laminate.

Incidentally, although the foregoing description of the above-mentioned examples has concentrated on the dispersion of TiO$_2$ fine particles, the polyoxyethylene alkyl ether phosphoric acid-based surfactant and the polyoxyethylene alkyl ether carboxylate surfactant have good affinity with various oxides and are thus preferably used for dispersions of fine particles made of other kinds of oxide, such as ZrO$_2$, Nb$_2$O$_5$, SiO$_2$, Al$_2$O$_3$, ZnO, ITO, IZO, and Y$_2$O$_3$. Additionally, although alternatives obtained by changing the number of carbons of an alkyl group and various derivatives may be employed, optimum ones thereof each have a molecular weight of 500 or more.

Although the examples using methyl ethyl ketone as the solvent have been described in the foregoing description thereof, other organic solvents, such as methyl isobutyl ketone, ethyl alcohol, and isopropanol, may be used. The selection of organic solvent enables the appropriate selection of a drying speed according to the condition of drying equipment used in a drying operation to be performed after the dispersion liquid is applied.

Third Example

Amount of Added Surfactant (TiO$_2$)

The component of fine particles is set to be T-1 (d=4.2, n=2.7). The components of an organic resin material are set to be R-3 and R-7 (d=1.16, n=1.54). The component of a surfactant is set to be A-7 (d=1.03, n=1.54). An amount of added fine particles is changed among three levels. An amount of the surfactant is changed between two levels. Thus, these fine particle dispersion compositions are used and cured to thereby form an optical component.

FIG. 12 shows the composition of the formed optical component and measured refractive indexes.

As is seen from results shown in FIG. 12, the rate of $TiO_2$ fine particles to the fine particle dispersion composition is expressed in terms of volume percentage (vol. %) and preferably 10 vol. % to 50 vol. %, provided that a total of components of the composition other than the organic solvent is set to be 100%. More preferably, the ratio of $TiO_2$ fine particles to the fine particle dispersion composition is 20 vol. % to 50 vol. %. When this is rewritten in terms of weight percentage (wt %), the ratio of fine particles is preferably, 28.9 wt. % to 79.3 wt. %, more preferably 47.8 wt. % to 79.3 wt. %. This is because of the facts that when the amount of added $TiO_2$ fine particles exceeds 50 vol. %, the bonding strength of the resin becomes too weak for practical use, and that when the amount of added $TiO_2$ fine particles is equal to or less than 20 vol. %, the effect of increasing the refractive index of the cured resin is small. However, the manufacturing method for the high refractive index optical component according to the invention is simple and a low cost one. Thus, although the refractive index of the resin does not extremely increase, a material having a refractive index of about 1.65 can be obtained from a basis resin having a refractive index of 1.5. Thus, when the ratio of $TiO_2$ fine particles to the fine particle dispersion composition is 10 vol. % or more, the invention has merits.

The rate expressed in terms of volume percentage (vol. %) of the surfactant to the organic resin components other than the $TiO_2$ fine particles in the fine particle dispersion composition is preferably 10 vol. % to 50 vol. %. This is because of the facts that when the amount of added $TiO_2$ fine particles exceeds 50 vol. %, the bonding strength of the resin becomes too weak for practical use, and that when the amount of added $TiO_2$ fine particles is equal to or less than 20 vol. %, the effect of promoting the dispersion of fine particles is not sufficiently obtained. Thus, when the rate of the $TiO_2$ fine particles ranges from 10 vol. % to 50 vol. %, the rate of the surfactant to the fine particle dispersion composition is preferably 5 vol. % to 45 vol. % in terms of volume percentage, and 4.7 wt. % to 33.0 wt. % in terms of weight percentage. Also, when the rate of the $TiO_2$ fine particles ranges from 20 vol. % to 50 vol. %, the rate of the surfactant to the fine particle dispersion composition is preferably 5 vol. % to 40 vol. %, and 4.7 wt. % to 24.0 wt. %.

As is understood from the above-mentioned results, the weight ratio of the surfactant to the $TiO_2$ fine particles is 0.095 to 1.1 when the rate of the $TiO_2$ fine particles is 10 vol. % to 50 vol. %. The weight ratio of the surfactant to the $TiO_2$ fine particles is 0.095 to 0.49 when the rate of the $TiO_2$ fine particles is 20 vol. % to 50 vol. %.

Fourth Example

Amount of Added Surfactant ($SiO_2$)

The component of fine particles is set to be $SiO_2$ (d=2.4, n=1.46). The component of an organic resin material are set to be R-9 (d=1.17, n=1.49). The component of a surfactant is set to be A-7 (d=1.03, n=1.5). An amount of added fine particles is changed among two levels. An amount of the surfactant is changed between two levels. Thus, these fine particle dispersion compositions are used and cured to thereby form an optical component.

FIG. 13 shows the composition of the formed optical component and measured refractive indexes.

As is seen from results shown in FIG. 13, the rate of $SiO_2$ fine particles to the fine particle dispersion composition is expressed in terms of volume percentage (vol. %) and preferably 20 vol. % to 50 vol. %, provided that a total of components of the composition other than the organic solvent is set to be 100%. When this is rewritten in terms of weight percentage (wt %), the ratio of fine particles is preferably, 34.2 wt % to 68.5 wt. %. This is because of the facts that when the amount of added $SiO_2$ fine particles exceeds 50 vol. %, the bonding strength of the resin becomes too weak for practical use, and that when the amount of added $SiO_2$ fine particles is equal to or less than 20 vol. %, the effect of decreasing the refractive index of the cured resin is small.

The rate expressed in terms of volume percentage (vol. %) of the surfactant to the organic resin components other than the $SiO_2$ fine particles in the fine particle dispersion composition is preferably 10 vol. % to 50 vol. %. This is because of the facts that when the amount of added $SiO_2$ fine particles exceeds 50 vol. %, the bonding strength of the resin becomes too weak for practical use, and that when the amount of added $TiO_2$ fine particles is equal to or less than 10 vol. %, the effect of promoting the dispersion of fine particles is not sufficiently obtained. Thus, the rate of the surfactant to the fine particle dispersion composition is preferably 5 vol. % to 40 vol. % in terms of volume percentage, and 2.7 wt. % to 30.3 wt. % in terms of weight percentage.

As is understood from the above-mentioned results, the weight ratio of the surfactant to the $SiO_2$ fine particles is 0.043 to 0.86.

Further, as is understood from the results in the case of the third and fourth examples, the weight ratio of the surfactant to the $SiO_2$ fine particles is preferably 0.043 to 1.1.

What is claimed is:

1. A fine particle dispersion composition, which becomes an optical component by being cured, comprising:
   metal-oxide fine particles;
   an organic resin material which cures by absorbing energy;
   surfactants selected from the group consisting of polyoxyethylene alkyl ether phosphoric acid-based surfactant and polyoxyethylene alkyl ether carboxylic acid-based surfactant, said surfactants having a molecular weight of 500 or more; and
   an organic solvent,
   wherein,
   said metal-oxide fine particles have an average particle diameter that is equal to or less than 0.03 μm, and
   said metal-oxide fine particles have a volume percentage that is 20 vol. % to 50 vol. % of the fine particle dispersion composition other than the organic solvent.

2. A fine particle dispersion composition according to claim 1, wherein said organic resin material is at least an organic resin selected from the group consisting of a thermosetting resin, an energy ray curing epoxy resin, an energy ray acrylate resin, and an energy ray curing oxetane resin.

3. A fine particle dispersion composition according to claim 1, wherein said metal-oxide fine particles are made of $TiO_2$.

4. A fine particle dispersion composition according to claim 1, wherein the weight ratio of the surfactant to the fine particles is 0.043 to 1.1.

5. An optical component which is obtained by curing fine particle dispersion composition, said composition comprising:
- metal-oxide fine particles;
- an organic resin material which cures by absorbing energy;
- surfactants selected from the group consisting of polyoxyethylene alkyl ether phosphoric acid-based surfactant and a polyoxyethylene alkyl ether carboxylic acid-based surfactant, said surfactants having a molecular weight of 500 or more; and
- an organic solvent, wherein,
- said metal-oxide fine particles have an average particle diameter that is equal to or less than 0.03 μm, and
- said metal-oxide fine particles have a volume percentage that is 20 vol. % to 50 vol. % of the fine particle dispersion composition other than the organic solvent.

6. An optical film laminate having a plurality of stacked optical films that differ in refractive index from one another, wherein at least one of the optical films is obtained by curing a fine particle dispersion composition that comprises:
- metal-oxide fine particles;
- an organic resin material which cures by absorbing energy;
- surfactants selected from the group consisting of polyoxyethylene alkyl ether phosphoric acid-based surfactant and polyoxyethylene alkyl ether carboxylic acid-based surfactant, said surfactants having a molecular weight of 500 or more; and
- an organic solvent, wherein,
- said metal-oxide fine particles have an average particle diameter that is equal to or less than 0.03 μm, and
- said metal-oxide fine particles have a volume percentage that is 20 vol. % to 50 vol. % of the fine particle dispersion composition other than the organic solvent.

7. A polarization splitting device having a transparent base member having inclined plane surfaces formed therein by grooving, said inclined plane surfaces differing in inclination direction from each other, said inclined plane surfaces having a polarization splitting multilayer film formed thereon, wherein at least one of the transparent base member and/or the polarization splitting multilayer film is obtained by curing a fine particle dispersion composition that comprises:
- metal-oxide fine particles;
- an organic resin material which cures by absorbing energy;
- surfactants selected from the group consisting of polyoxyethylene alkyl ether phosphoric acid-based surfactant and polyoxyethylene alkyl ether carboxylic acid-based surfactant, said surfactants having a molecular weight of 500 or more; and
- an organic solvent, wherein,
- said metal-oxide fine particles have an average particle diameter that is equal to or less than 0.03 μm, and
- said metal-oxide fine particles have a volume percentage that is 20 vol. % to 50 vol. % of the fine particle dispersion composition other than the organic solvent.

8. A method of manufacturing an optical component, comprising the steps of:
- performing dispersion treatment on metal-oxide fine particles, an organic resin material which cures by absorbing energy, and surfactants selected from the group consisting of polyoxyethylene alkyl ether phosphoric acid-based surfactant and a polyoxyethylene alkyl ether carboxylic acid-based surfactant, said surfactants having a molecular weight of 500 or more, in an organic solvent, together with hard metallic balls or ceramic balls;
- subsequently applying dispersion solution; and
- evaporating the organic solvent, wherein,
- said metal-oxide fine particles have an average particle diameter that is equal to or less than 0.03 μm, and
- said metal-oxide fine particles have a volume percentage that is 20 vol. % to 50 vol. % of the fine particle dispersion composition other than the organic solvent.

* * * * *